(12) United States Patent
Dooley et al.

(10) Patent No.: US 10,941,671 B2
(45) Date of Patent: Mar. 9, 2021

(54) GAS TURBINE ENGINE COMPONENT INCORPORATING A SEAL SLOT

(71) Applicant: General Electric Company, Schenectady, NY (US)

(72) Inventors: Weston Nolan Dooley, West Chester, OH (US); James Michael Hoffman, Hamilton Township, OH (US); Gregory Terrence Garay, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1062 days.

(21) Appl. No.: 15/467,431

(22) Filed: Mar. 23, 2017

(65) Prior Publication Data

US 2018/0274381 A1 Sep. 27, 2018

(51) Int. Cl.
*F01D 11/00* (2006.01)
*F01D 5/30* (2006.01)

(52) U.S. Cl.
CPC .............. *F01D 11/006* (2013.01); *F01D 5/30* (2013.01); *F05D 2220/32* (2013.01); *F05D 2240/55* (2013.01); *F05D 2240/57* (2013.01); *F05D 2250/71* (2013.01)

(58) Field of Classification Search
CPC ......... F01D 11/005; F01D 11/008; F01D 5/30
See application file for complete search history.

(56) References Cited

U.S. PATENT DOCUMENTS

| | | | | |
|---|---|---|---|---|
| 1,554,614 A | * | 9/1925 | Allen | F01D 5/22 416/190 |
| 2,356,605 A | * | 8/1944 | Meininghaus | F01D 5/06 416/198 R |
| 3,887,298 A | * | 6/1975 | Hess | F01D 5/22 416/220 R |
| 4,182,598 A | * | 1/1980 | Nelson | F01D 5/22 416/193 A |
| 4,417,848 A | | 11/1983 | Dembeck | |
| 4,872,810 A | * | 10/1989 | Brown | F01D 5/22 416/145 |
| 5,302,085 A | * | 4/1994 | Dietz | F01D 5/22 416/193 A |
| 5,513,955 A | * | 5/1996 | Barcza | F01D 5/22 416/193 A |
| 5,827,047 A | * | 10/1998 | Gonsor | F01D 5/22 416/193 A |
| 5,924,699 A | * | 7/1999 | Airey | F01D 11/008 277/411 |
| 7,322,797 B2 | * | 1/2008 | Lee | F01D 5/22 415/115 |
| 7,762,780 B2 | | 7/2010 | Decardenas | |
| 8,122,702 B2 | | 2/2012 | Tsou et al. | |
| 8,672,626 B2 | * | 3/2014 | Boy | F01D 5/26 416/1 |
| 8,820,754 B2 | | 9/2014 | Stewart et al. | |

(Continued)

*Primary Examiner* — Woody A Lee, Jr.
(74) *Attorney, Agent, or Firm* — General Electric; James Reed (57) ABSTRACT

A turbine engine component includes: a body bounded by an end face; and a seal slot having an opening communicating with the end face, the seal slot including a receptacle defining a boundary configured to receive and position a spline seal, and an open chamber communicating with the seal slot and extending beyond the boundary.

15 Claims, 9 Drawing Sheets

(56) References Cited

U.S. PATENT DOCUMENTS

| | | | |
|---|---|---|---|
| 9,810,087 B2* | 11/2017 | Corcoran | F02C 7/18 |
| 9,951,625 B2* | 4/2018 | Congratel | F01D 5/22 |
| 10,087,769 B2* | 10/2018 | Dungs | F01D 5/3015 |
| 2009/0092485 A1* | 4/2009 | Bridges, Jr. | F01D 9/041 |
| | | | 415/173.7 |
| 2012/0049467 A1* | 3/2012 | Stewart | F01D 11/006 |
| | | | 277/641 |
| 2014/0023487 A1 | 1/2014 | Dougan et al. | |
| 2015/0167480 A1 | 6/2015 | Pearson et al. | |
| 2016/0017716 A1 | 1/2016 | Haggmark et al. | |
| 2016/0273367 A1 | 9/2016 | Lana et al. | |

* cited by examiner

GAS TURBINE ENGINE COMPONENT INCORPORATING A SEAL SLOT

BACKGROUND OF THE INVENTION

This invention relates generally to turbine engines, and more particularly to apparatus and methods for reducing component weight in such engines.

A typical gas turbine engine includes a turbomachinery core having a compressor, a combustor, and a turbine in serial flow relationship. The core is operable in a known manner to generate a primary gas flow. The core may be combined with an appropriate nozzle to generate propulsive thrust (turbojet), or may be combined with additional turbines to drive a mechanical load (turboshaft or turboprop), or a fan for providing thrust (turbofan).

It is generally desirable to minimize the overall weight of a turbine engine. This is especially true for aircraft gas turbine engines, where the performance and efficiency of the engine and the aircraft that it powers is directly affected by the engine's weight. For example, increasing the weight of an aircraft engine can lead to a requirement for a strengthened (i.e. heavier) engine mount and airframe, and work can require additional aircraft fuel capacity, which in turn further increases the weight of the airframe.

In addition, a typical gas turbine engine includes numerous rotating components that operate at high rotational speeds and thus generate substantial centrifugal loads. These loads apply stresses to the rotating components such as rotors and blades in proportion to their mass.

Both stationary and rotating turbine engine components such as turbine stators or nozzles, blades, and blade shrouds are often configured as a ring of side-by-side segments. Air leakage between adjacent segments must be minimized in order to meet engine performance requirements This is often accomplished using spline seals which are small metallic strips that are received in seal slots formed in two adjacent segments, bridging the gaps therebetween.

For at least the above reasons, there is an ongoing desire and need to reduce the mass of stationary and rotating gas turbine components that include seal slots.

BRIEF DESCRIPTION OF THE INVENTION

This need is addressed by a turbine component including a seal slot with a portion configured to retain a spline seal in a predetermined position, and an adjoining open volume which reduces the weight of the component.

According to one aspect of the technology described herein, a turbine engine component includes: a body bounded by an end face; and a seal slot having an opening communicating with the end face, the seal slot including a receptacle defining a boundary configured to receive and position a spline seal, and an open chamber communicating with the seal slot and extending beyond the boundary.

According to another aspect of the technology described herein, a sealing apparatus for a turbine engine includes: a component having a body bounded by an end face; a seal slot having an opening communicating with the end face, the seal slot including a receptacle defining a boundary configured to receive and position a spline seal; and a spline seal received in the seal slot, wherein the seal slot and the spline seal are configured such that an open space is defined between the seal slot and the spline seal.

According to another aspect of the technology described herein, a turbine engine component includes: a body bounded by an end face; and a seal slot having an opening communicating with the end face, wherein the opening includes at least two spaced-apart walls defining a perimeter on the end face; and wherein at least one of the walls includes an expanded area extending beyond the perimeter.

BRIEF DESCRIPTION OF THE DRAWINGS

The invention may be best understood by reference to the following description taken in conjunction with the accompanying drawing figures in which.

DETAILED DESCRIPTION OF THE INVENTION

The concept described herein relates to the modification of the design of a turbine engine component incorporating one or more slots for a spline seal by providing a locating structure, e.g. a "receptacle" configured to retain the spline seal in a desired position, and by removing excess material not required to perform that function in order to reduce the mass of turbine component.

Figure 1:
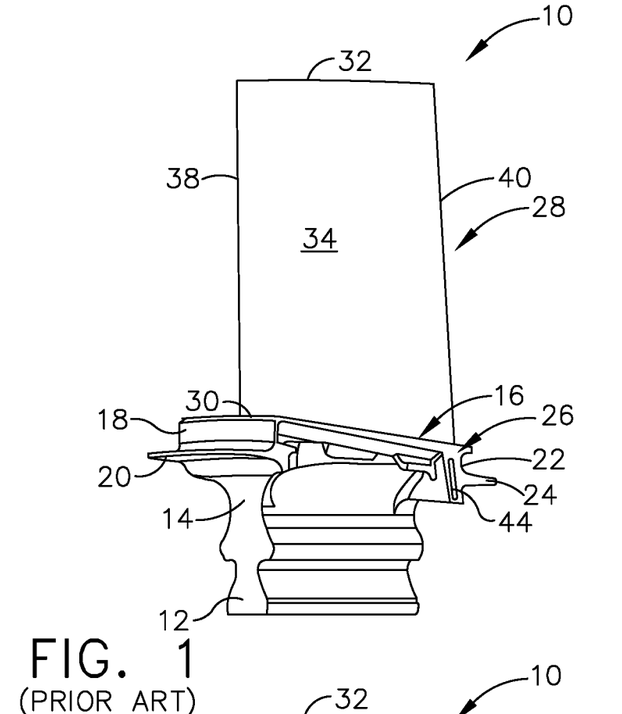
FIG. 1 is a schematic front perspective view of a prior art turbine blade of a gas turbine engine, incorporating a spline seal apparatus.

Now, referring to the drawings wherein identical reference numerals denote the same elements throughout the various views, FIG. 1 depicts an exemplary turbine blade 10. The turbine blade 10 is just one example of numerous components within a gas turbine engine or similar turbomachinery apparatus in which an annular assembly is built up from a ring of individual components, each defining an arc segment. Such components could be located anywhere in the engine and are not limited to a particular module. Nonlimiting examples of such components include the inner or outer bands of stationary airfoil vanes, the platforms of turbomachinery blades, or the ends of shroud segments.

The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A laterally-extending forward flange 18 is positioned inboard of the platform 16, at a forward end of the platform 16. An arcuate sealing flange referred to as a "forward angel wing" 20 extends axially forward from the forward flange 18. A laterally-extending aft flange 22 is positioned inboard of the platform 16, at an aft end of the platform 16. An arcuate sealing flange referred to as an "aft angel wing" 24 extends axially rearward from the aft flange 22. Collectively, the platform 16, forward flange 18, and the aft flange 22 define pair of spaced-apart end faces 26 which define the extreme lateral boundaries of the turbine blade 10.

A hollow airfoil 28 extends radially outwardly from the platform 16 and into the hot gas stream. The airfoil has a root 30 at the junction of the platform 16 and the airfoil 28, and a tip 32 at its radially outer end. The airfoil 28 has a concave pressure side wall 34 and a convex suction side wall 36 joined together at a leading edge 38 and at a trailing edge 40. The airfoil 28 may take any configuration suitable for extracting energy from the hot gas stream and causing rotation of the rotor disk. By way of example and not of limitation, the turbine blade 10 may be formed from a suitable aerospace alloy, such as a nickel- or cobalt-based superalloy, which has acceptable strength at the elevated temperatures of operation in a gas turbine engine.

Figure 2:
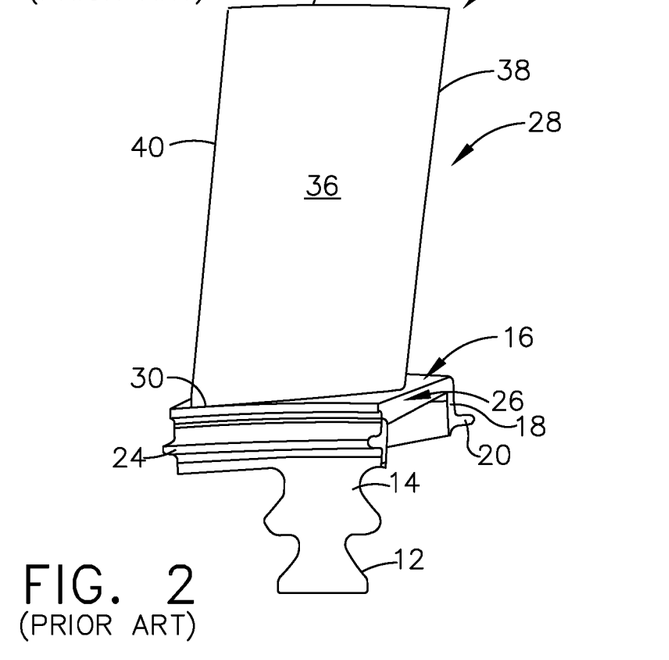
FIG. 2 is a schematic rear perspective view of the turbine blade of FIG. 1.
Figure 3:
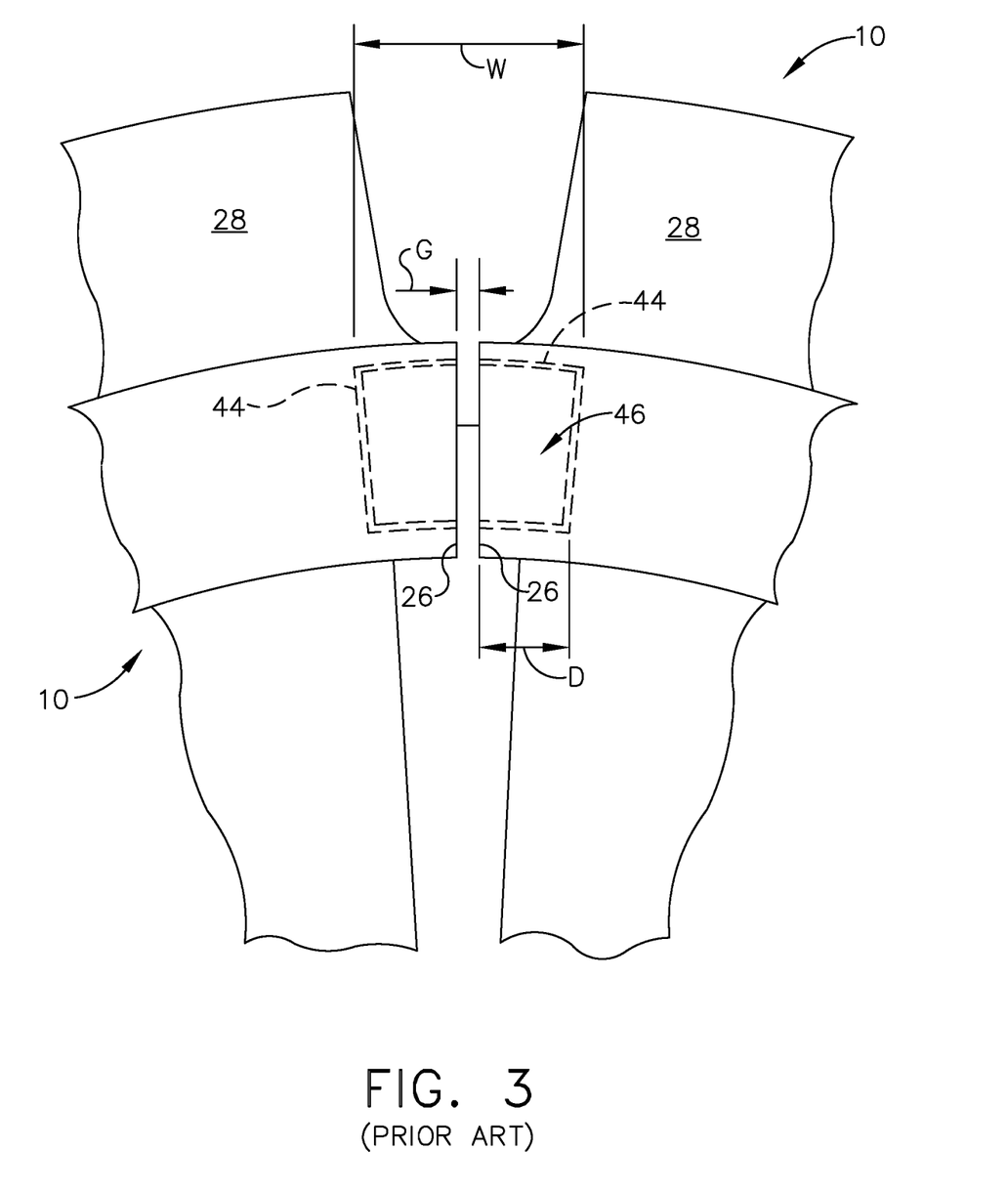
FIG. 3 is a schematic rear elevational view of a pair of prior art turbine blades as shown in FIG. 1 assembled with a spline seal spanning a gap therebetween.

In the example shown in FIGS. 1, 2, and 3, the end faces 26 include seal slots formed therein in accordance with conventional prior art practice. A seal slot 44 is formed in the end face 26, specifically into the portion of the end face 26 defined by the aft flange 22. As seen in FIG. 3, when a ring or annular array of turbine blades 10 is assembled, the end faces 26 lie in close proximity to each other in a facing relationship with a small gap "G" defined therebetween. A spline seal 46 is received in the seal slots 44 of the adjacent turbine blades 10 and spans the gap G. Typically, the spline seal 46 is a thin, plate-like member of metal stock. The function of the spline seal 46 is to prevent air leakage through the gap G. The seal slot 44 has a basic depth D, defined by its shallowest portion, which represents a desired seating depth of the corresponding spline seal 46. For example, the seating depth D may be on the order of one-half of the total width W of the spline seal 46. When assembled, the spline seal 46 essentially fills the entire volume of the seal slot 44.

Figure 4:
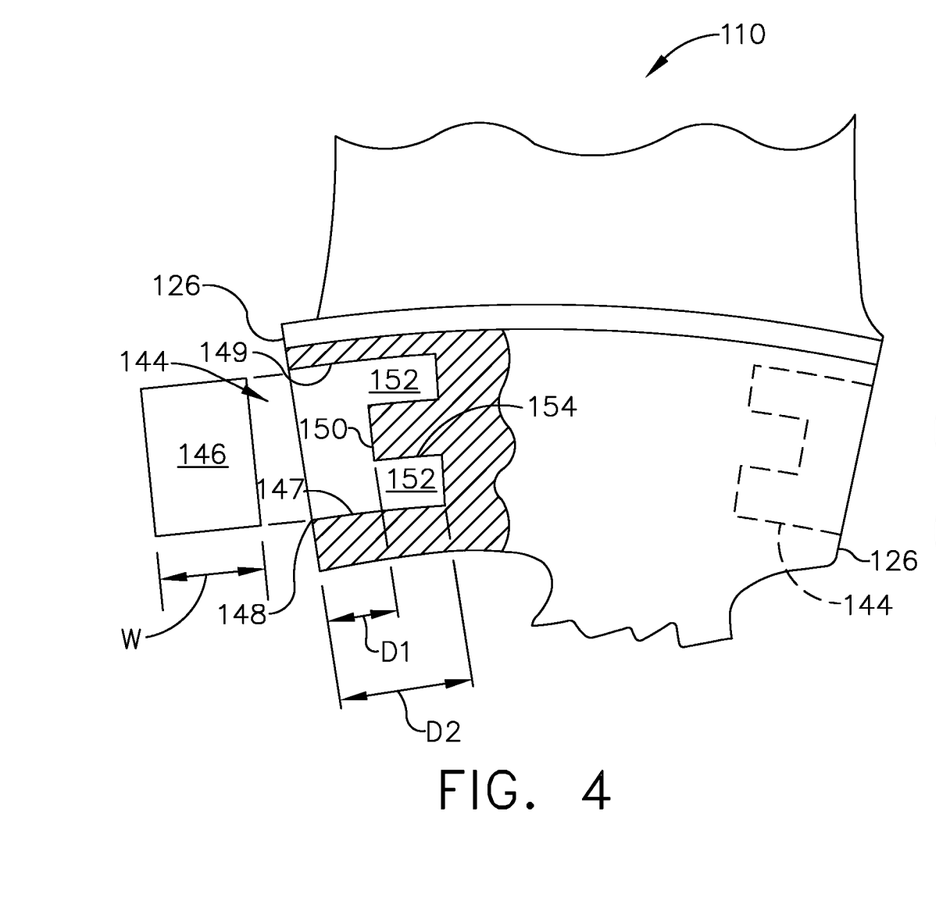
FIG. 4 is a partially-sectioned view of a portion of a turbine blade incorporating an embodiment of a spline seal assembly.
Figure 5:
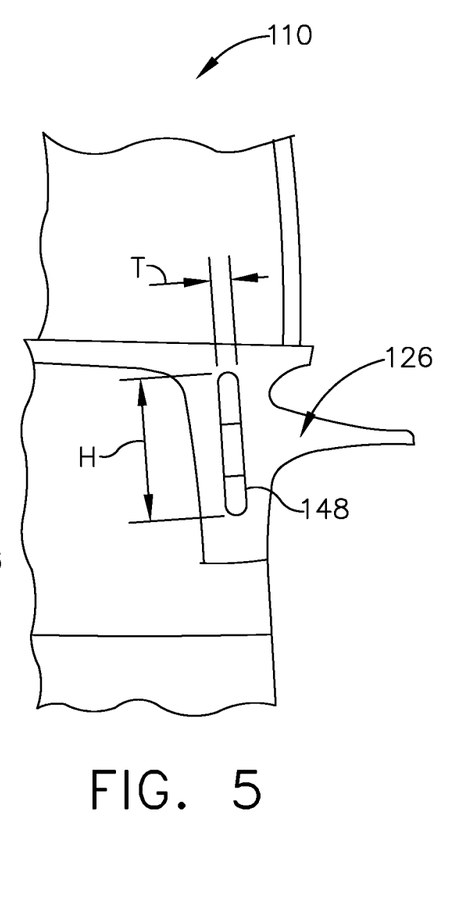
FIG. 5 is a side elevational view of the turbine blade of FIG. 4.

FIGS. 4 and 5 illustrate a portion of a turbine blade 110 similar to the turbine blade 10 described above, modified to incorporate an embodiment of a seal slot configured for weight reduction. Elements of the turbine blade 110 not specifically described may be taken to be identical to the turbine blade 10. Each end face 126 of the turbine blade 10 has a seal slot 144 formed therein as described above for turbine blade 10. The seal slot 144 has an opening 148 intersecting the end face 126. The radial height H and the axial thickness T (FIG. 5) of the opening 148 are selected to permit entry of a spline seal 146. The seal slot 144 extends from the opening 148 laterally inward towards the center of the turbine blade 10 and is bounded by inboard and outboard walls 147, 149 respectively. The seal slot 144 has a basic depth D1, defined by its shallowest portion, which represents a desired seating depth of the corresponding spline seal 146. For example, the seating depth D1 may be on the order of one-half of the total width W of the spline seal 146. The seal slot 144 includes at least one portion that is deeper than the seating depth D1. In the illustrated example, the seal slot 144 includes a centrally-located rib 150 that defines the seating depth D1, and is flanked at inboard and outboard locations by extended recesses 152, defining an extended depth D2 greater than the seating depth D1. Collectively, the inboard and outboard walls 147, 149 and the rib 150 define a receptacle having a boundary which is configured to receive and position the spline seal 146, and the extended recesses 152 define an open chamber that communicates with the receptacle.

The specific configuration of the seal slot 144 including the configuration of the end wall 154 defining the depths D1, D2 may be altered to suit a specific application. For example, FIG. 4 shows the rib 150 and the extended recesses 152 being defined by a generally stair-step shape. However, the shape could instead be a tapered shape or a curved shape (not shown). Furthermore, the relationship of the relatively more shallow and relatively more deep portions may be altered from that shown. For example, the rib 150 could be located at the inboard or outboard extremity of the seal slot 144, with the remainder of the radial distance constituting an extended-depth recess.

Figure 6:
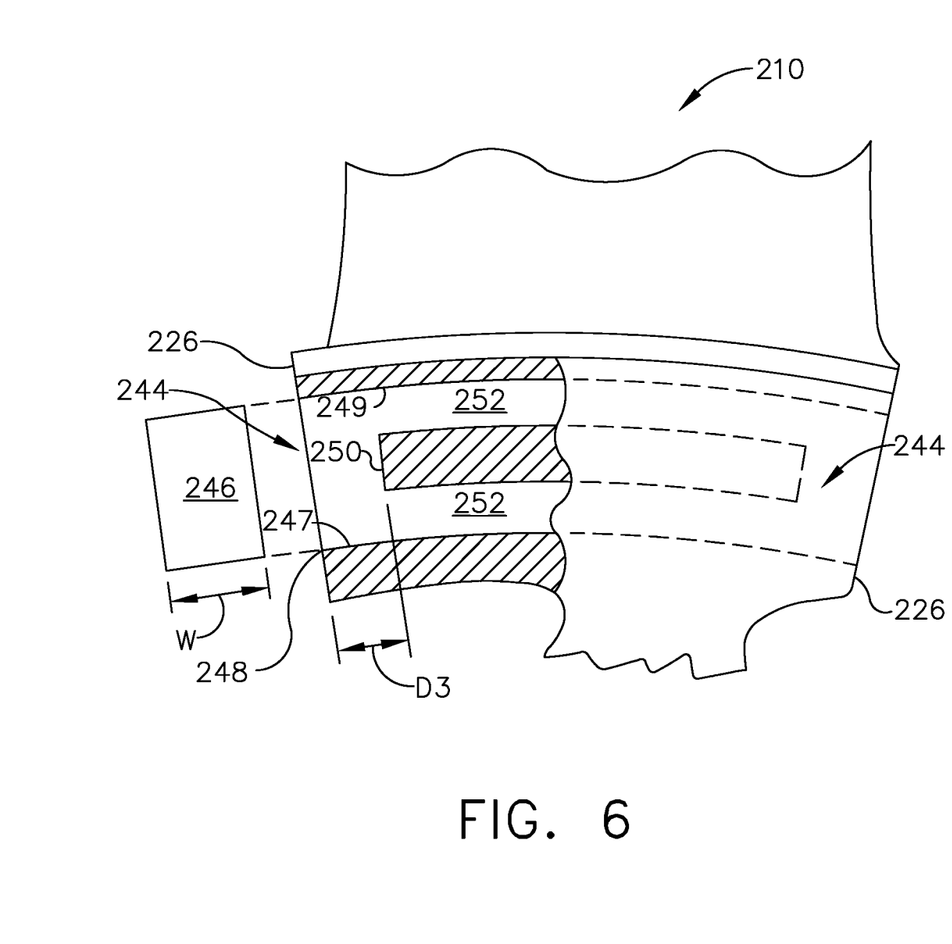
FIG. 6 is a partially-sectioned view of a portion of a turbine blade incorporating an alternative spline seal assembly.
Figure 7:
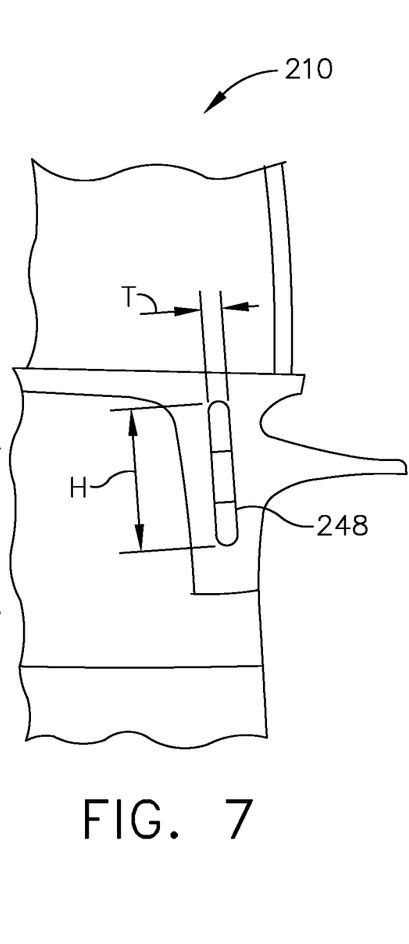
FIG. 7 is a side elevational view of the turbine blade of FIG. 6.

FIGS. 6 and 7 illustrate a portion of an exemplary turbine blade 210 similar to the turbine blade 10 described above, modified to incorporate an alternative embodiment of a seal slot configured for weight reduction. Elements of the turbine blade 210 not specifically described may be taken to be identical to the turbine blade 10. Each end face 226 of the turbine blade 210 has a seal slot 244 formed therein. The seal slot 244 has an opening 248 intersecting the end face 226. The radial height H and the axial thickness T (FIG. 7) of the opening 248 are selected to permit entry of a spline seal 246. The seal slot 244 extends from the opening 248 laterally inward towards the center of the turbine blade 10 and is bounded by inboard and outboard walls 247, 249 respectively. The seal slot 244 has a basic depth D3, defined by its shallowest portion, which represents a desired seating depth of the corresponding spline seal 246. For example, the depth D3 may be on the order of one-half of the total width W of the spline seal 246. A centrally-located rib 250 defines the seating depth D3. The rib 250 is flanked at inboard and outboard locations by through-slots 252 which extend between the end faces 244 and interconnect the seal slots 244. Collectively, the inboard and outboard walls 247, 249 and the rib 250 define a receptacle having a boundary which is configured to receive and position the spline seal 246, and the through-slots 252 define an open chamber that communicates with the receptacle.

As with the rib 150 described above, the location and size of the rib 250 may be varied to suit a particular application. For example, the rib 250 could be located at the inboard or outboard extremity of the seal slots 244. Alternatively, the rib 250 need not extend continuously across the tangential direction of the turbine blade 210; for example a short rib may be provided at each end to define the seating depth, and the central portion may be left open continuous with the through slots 252.

Figure 8:
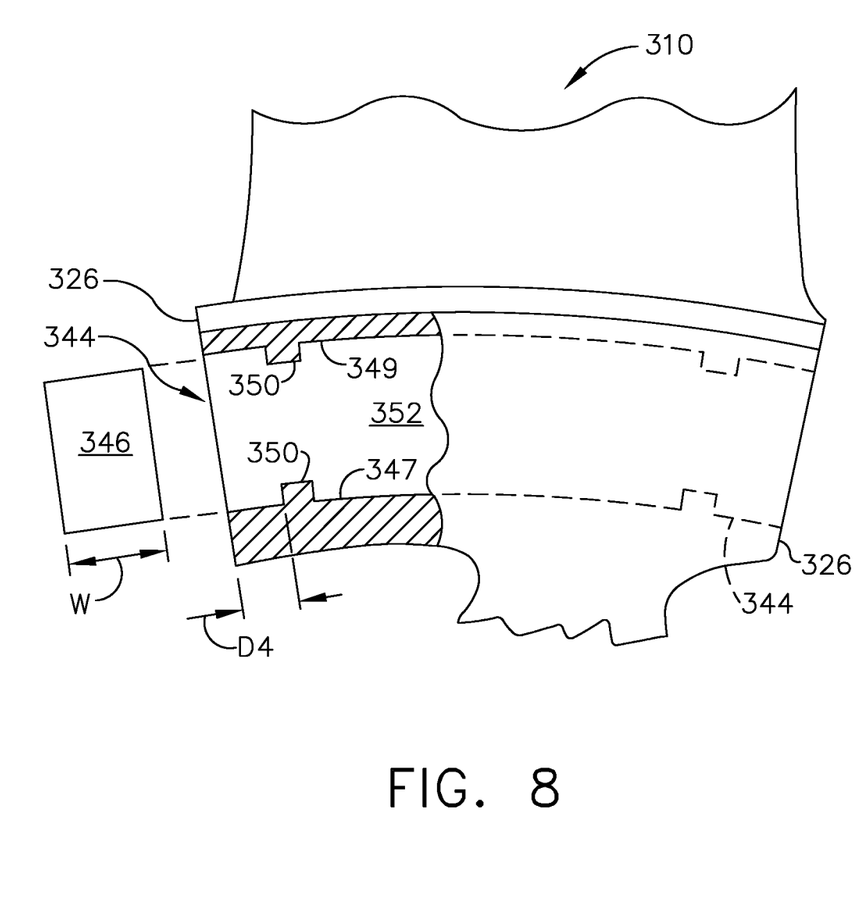
FIG. 8 is a partially-sectioned view of a portion of a turbine blade incorporating an alternative spline seal assembly.
Figure 9:
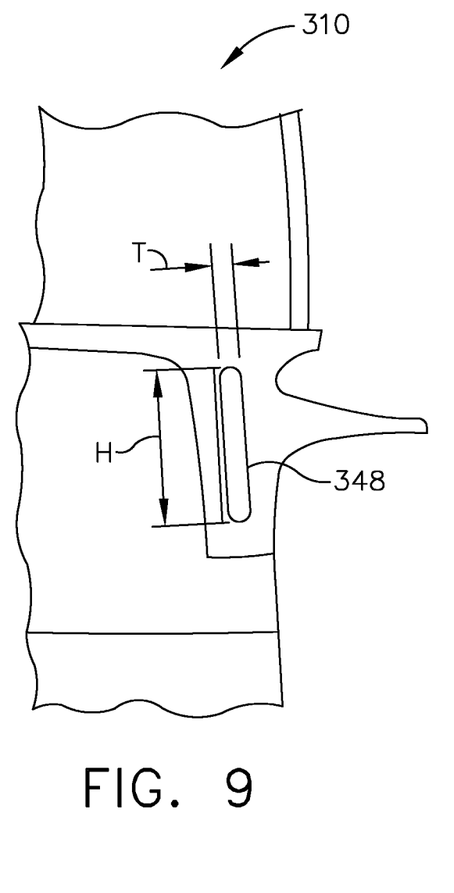
FIG. 9 is a side elevational view of the turbine blade of FIG. 8.

FIGS. 8 and 9 illustrate a portion of a representative turbine blade 310 similar to the turbine blade 10 described above, modified to incorporate an alternative embodiment of a seal slot configured for weight reduction. Elements of the turbine blade 310 not specifically described may be taken to be identical to the turbine blade 10. Each end face 326 of the turbine blade 310 has a seal slot 344 formed therein. The seal slot 344 has an opening 348 intersecting the end face 326. The radial height H and the axial thickness T (FIG. 9) of the opening 348 are selected to permit entry of a spline seal 346. The seal slot 344 extends from the opening 348 laterally inward towards the center of the turbine blade 310 and is bounded by inboard and outboard walls 347, 349 respectively. The seal slot 344 has a basic depth D4, defined by its shallowest portion, which represents a desired seating depth of the corresponding spline seal 346. For example, the seating depth D4 may be on the order of one-half of the total width W of the spline seal 346. In this embodiment, the seating depth D4 is defined by small tabs 350 at the inboard periphery, the outboard periphery, or both. The remainder of the space between the two end faces 344 may be a continuous hollow chamber 352. Collectively, the inboard and outboard walls 347, 349 and the tabs 350 define a receptacle having a boundary which is configured to receive and position the spline seal 346, and the hollow chamber 352 defines an open chamber that communicates with the receptacle.

Figure 10:
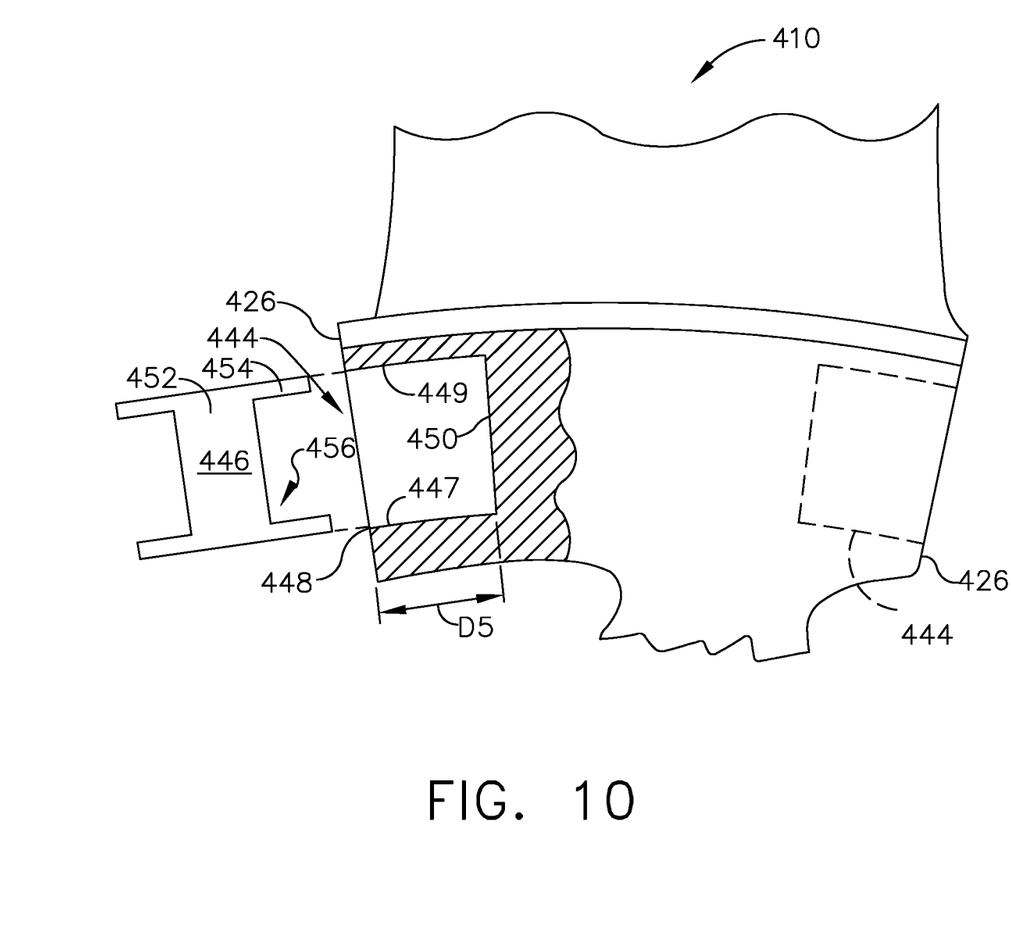
FIG. 10 is a partially-sectioned view of a portion of a turbine blade incorporating an alternative spline seal assembly.
Figure 11:
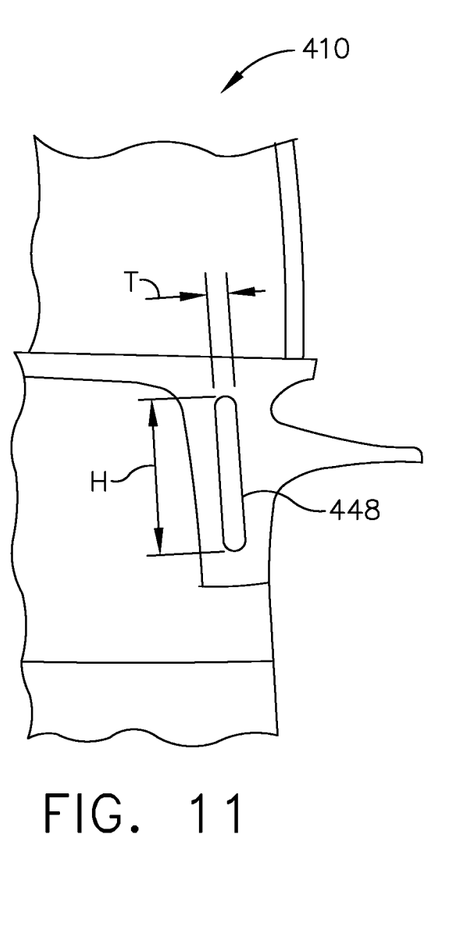
FIG. 11 is a side elevational view of the turbine blade of FIG. 10.

FIGS. 10 and 11 illustrate a portion of an exemplary turbine blade 410 similar to the turbine blade 10 described above, modified to incorporate an alternative embodiment of a seal slot configured for weight reduction. Elements of the turbine blade 410 not specifically described may be taken to be identical to the turbine blade 10. Each end face 426 of the turbine blade 410 has a seal slot 444 formed therein. The seal slot 444 has an opening 448 intersecting the end face 426. The radial height H and the axial thickness T (FIG. 11) of the opening 448 are selected to permit entry of a spline seal 446. The seal slot 444 extends from the opening 448 laterally inward towards the center of the turbine blade 410 and is bounded by inboard and outboard walls 447, 449 respectively. An end wall 450 of the seal slot 444 represents a depth D5 which may be arbitrarily selected for the purpose of mass reduction.

The spline seal 446 includes a body 452 and one or more standoffs 454 extending away from the body 452 in a direction generally corresponding to the tangential direction of the turbine blade 410.

When inserted into the seal slot formed 44, the seating depth of the spline seal 446 is limited or defined by the standoffs 454, such that an open space 456 is defined between the seal slot 444 and the body 452. This open space 456 represents a reduction in mass as compared to a prior art configuration in which the spline seal fills the entire seal slot. The specific configuration of the spline seal 446 including the number, shape, and dimensions of the standoffs 454 may be altered to suit a specific application.

Figure 12:
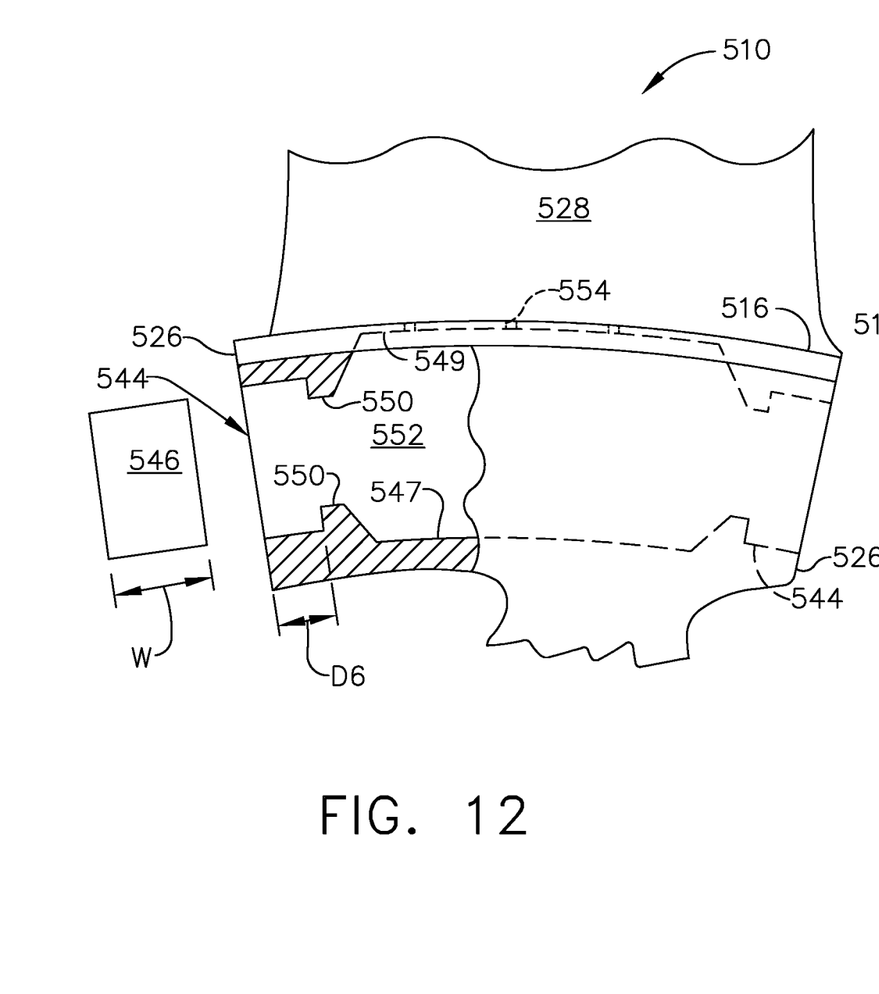
FIG. 12 is a partially-sectioned view of a portion of a turbine blade incorporating an alternative spline seal assembly.
Figure 13:
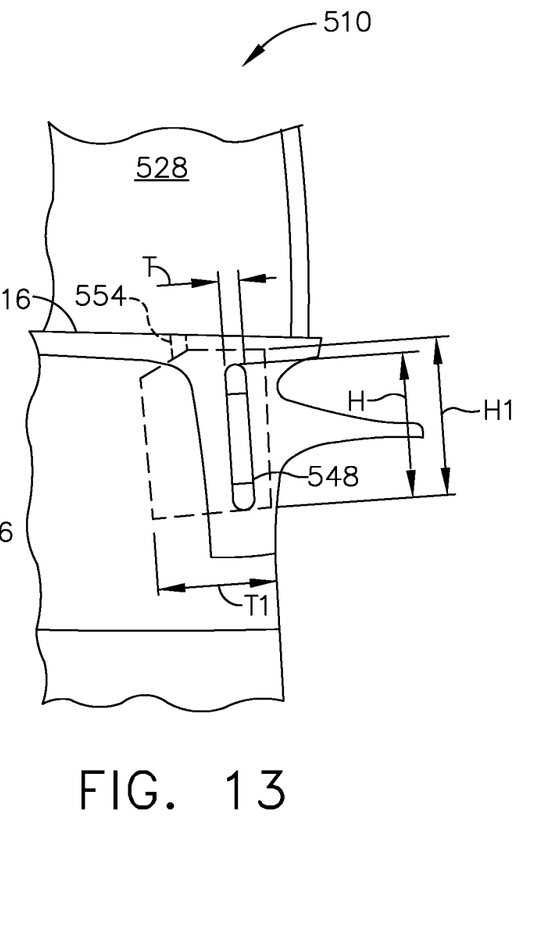
FIG. 13 is a side elevational view of the turbine blade of FIG. 12.

FIGS. 12 and 13 illustrate a portion of an exemplary turbine blade 510 similar to the turbine blade 10 described above, modified to incorporate an alternative embodiment of a seal slot configured for weight reduction. Elements of the turbine blade 510 not specifically described may be taken to be identical to the turbine blade 10 described above. Each end face 526 of the turbine blade 510 has a seal slot 544 formed therein. The seal slot 544 has an opening 548 intersecting the end face 526. The radial height H and the axial thickness T (FIG. 13) of the opening 548 are selected to permit entry of a spline seal 546. The seal slot 544 extends from the opening 548 laterally inward towards the center of the turbine blade 10 and is bounded by inboard and outboard walls 547, 549 respectively. The seal slot 544 has a basic depth D6, defined by its shallowest portion, which represents a desired seating depth of the corresponding spline seal 546. For example, the seating depth D6 may be on the order of one-half of the total width W of the spline seal 546. In this embodiment, the seating depth D6 is defined by small tabs 550 at the inboard periphery, the outboard periphery, or both. The remainder of the space between the two end faces 526 may be a continuous hollow chamber 552. In particular, the chamber 552 may be larger than the opening 548 measured in at least one of the axial and radial dimensions, that is, in at least one direction measured parallel to the plane of the end face 526. In the illustrated example, the chamber 552 has a portion with a radial height H1 greater than a radial height of the opening H, and a portion with an axial dimension T1 greater than an axial width T of the opening 548. Collectively, the inboard and outboard walls 547, 549 and the tabs 550 define a receptacle having a boundary which is configured to receive and position the spline seal 546, and the hollow chamber 552 defines an open chamber that communicates with the receptacle.

Optionally, the presence of the enlarged chamber 552 may be used to supply cooling air to portions of the turbine blade 510. In the example shown in FIGS. 12 and 13, portions of the chamber 552 extend underneath the platform 516 of the turbine blade 510. One or more cooling holes 554 may be provided interconnecting the chamber 552 and the flowpath surface or "hot side" of the platform 516. In operation, high-pressure air entering the chamber 552 between the spline seal 546 and the opening 548 would be discharged through the cooling holes 554, providing cooling for the platform 516 and/or airfoil 528.

Figure 14:
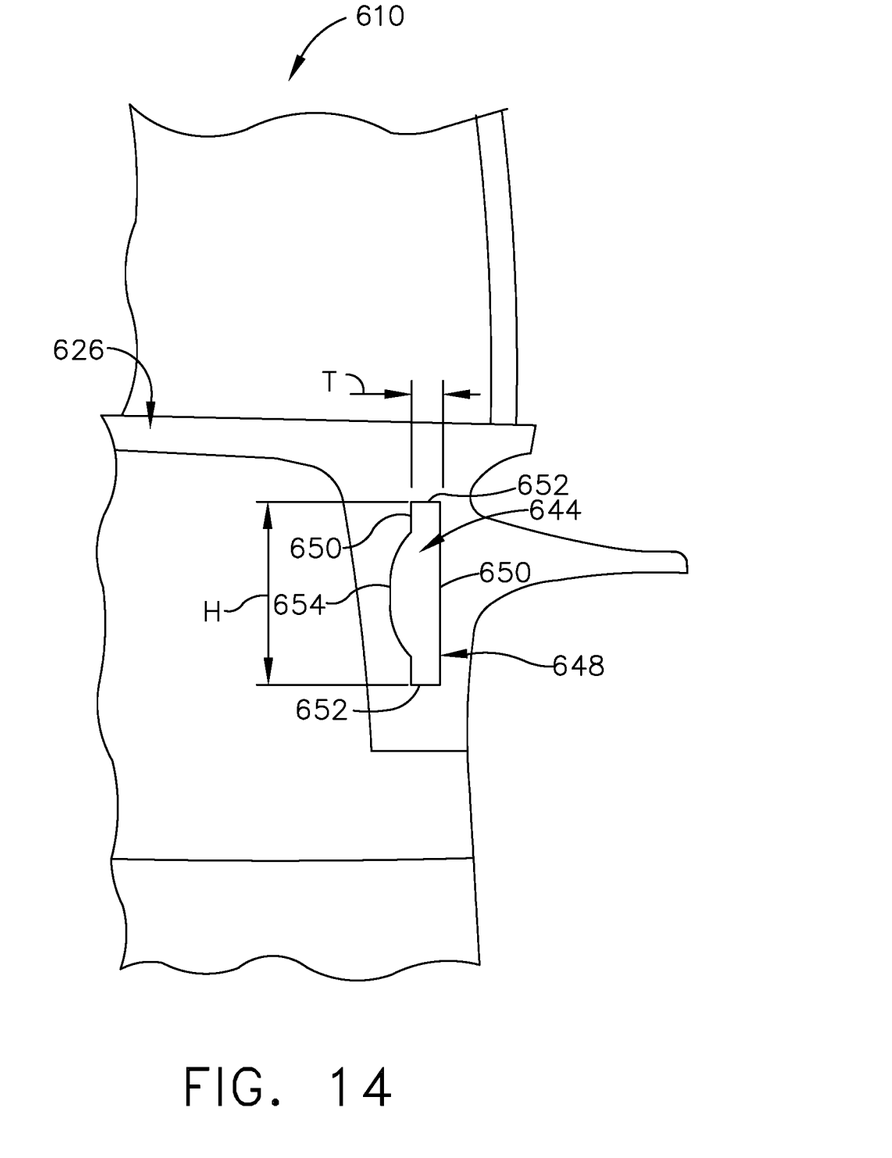
FIG. 14 is a side elevational view of a turbine blade incorporating an enlarged seal slot opening.

In addition to or as an alternative to the enlarged seal slot configuration described above, mass reduction is possible by selectively enlarging the perimeter of a seal slot opening. For example, FIG. 14 illustrates a portion of a representative turbine blade 610 similar to the turbine blade 10 described above. Elements of the turbine blade 610 not specifically described may be taken to be identical to the turbine blade 10 described above. Each end face 626 of the turbine blade 610 has a seal slot 644 formed therein. The seal slot 644 has an opening 648 intersecting the end face 626. The basic radial height H and the axial thickness T of the opening 648 are selected to permit entry of a spline seal (not shown). The opening 648 is generally rectangular being defined by a pair of spaced-apart side walls 650 interconnected by a pair of spaced-apart end walls 652.

One or more of the side walls 650 and end walls 652 may include a weight reduction feature in the form of an expanded area such as a cutout, notch, or fillet which extends the boundary of the respective wall. In the example shown in FIG. 14, a curved notch 654 is formed along a portion of the forward side wall 650. The notch 654 reduces the mass of the turbine blade 610 while still leaving enough material in the opening 648 to positively retain a spline seal in the correct position. The specific configuration of the opening 648 including the number, shape, and dimensions of the notch (or notches) 654 may be altered to suit a specific application.

Figure 15:
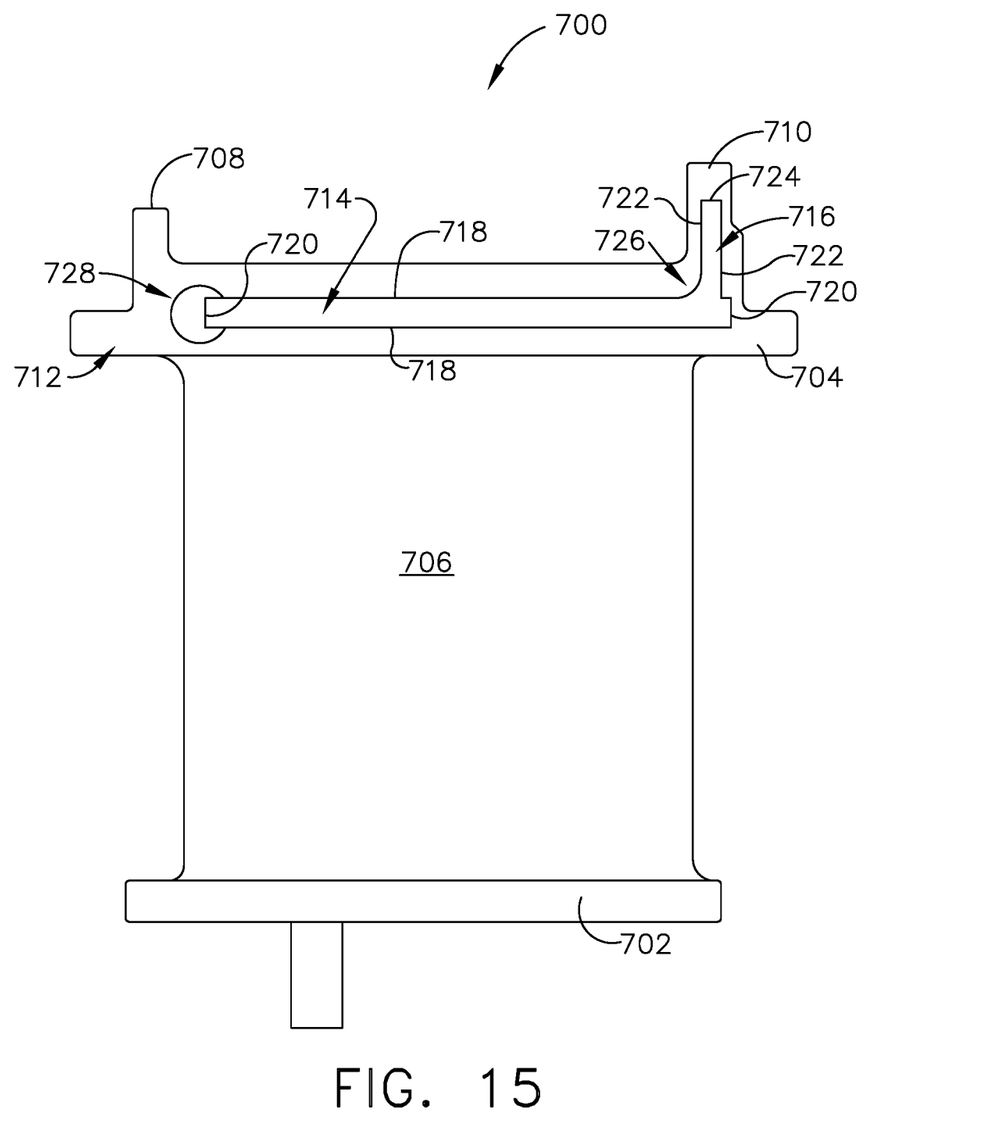
FIG. 15 is a side elevation view of a turbine nozzle segment incorporating an alternative seal slot.

A similar concept may be employed for components including multiple seal slots. For example, FIG. 15 illustrates an exemplary nozzle segment 700 including an arcuate inner band 702 that is connected to an arcuate outer band 704 by one or more airfoils 706. A plurality of such nozzle segments 700 are assembled into a ring or annular array to form a turbine nozzle in a gas turbine engine. Forward and aft flanges 708, 710 extend radially outward from forward and aft ends of the outer band 704, respectively. The outer band 704 and flanges 708, 710 cooperate to define a pair of spaced-apart end faces 712, one of which is seen in FIG. 15.

Each end face 712 has seal slots formed into it to receive spline seals similar to those seals described above. In the illustrated example, there is a generally axially-extending axial slot 714, and a generally-radially-extending radial slot 716 formed at the axial location of the aft flange 710. The two seal slots 714 and 716 cooperate to define an L-shape.

The axial slot 714 is bounded by a pair of spaced-apart slot walls 718 which extend parallel to each other. Distal ends of the axial slot 724 are bounded by end walls 720 which interconnect the slot walls 718. The slot walls 718 are spaced apart a predetermined distance to provide a predetermined clearance for the thickness of a spline seal (not shown).

The radial slot 716 is bounded by a pair of spaced-apart slot walls 722 which extend parallel to each other. Distal ends of the radial slot 716 are bounded by one or more end walls 724 which interconnect the slot walls 722. It is noted that the radial slot 716 may be bounded in part by one of the slot walls 718. The slot walls 722 are spaced apart a predetermined distance to provide a predetermined clearance for the thickness of a spline seal (not shown).

One or more of the axial and radial slots 714, 716 may include a weight reduction feature in the form of an expanded area such as a cutout, notch, or fillet which extends the boundaries of one or more of the walls defining the slot. In one example shown in FIG. 15, a curved fillet 726 is formed at the inside corner of the intersecting axial and radial slots 714, 716.

In another example also seen in FIG. 15, a circular cross-section recess or blind hole 728 is formed at a distal end of the axial slot 714. It is noted that the recess 728 may be formed separately from the adjacent end wall 720, or it may subsume all or part of the end wall 720 (i.e. illustrated end wall 720 might not be present in all embodiments).

Various methods may be used to construct any of the components described above and the corresponding seal slots. In the case of a seal slot or related opening having a prismatic shape, for example as shown in FIGS. 4 and 5, the seal slot may be formed using an appropriately-shaped tool in a electro discharge machining ("EDM") process.

In the case of a seal slot or related opening having an adjacent open volume of increased dimensions, for example as shown in FIGS. 12 and 13, the slot and/or the volume may be formed using alternative techniques such as investment casting or additive manufacturing.

The present invention has the technical effect and advantage relative to the prior art of lowering the weight of a gas turbine engine component while providing the necessary support for spline seals.

The foregoing has described a seal slot apparatus for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A turbine engine component, comprising:
   a body bounded by a first end face and a second end face spaced from the first end face; and
   a first seal slot formed in the first end face and having an opening with a closed, continuous perimeter on the first end face, the opening communicating with the first end face, the first seal slot including a receptacle having a first depth and defining a boundary configured to receive and position a spline seal, and an open chamber communicating with the receptacle and extending beyond the boundary;
   the second end face including a second seal slot, the second seal slot having an opening communicating with the second end face, and including a receptacle defining a boundary configured to receive and position a spline seal, wherein the first and second seal slots are interconnected by the open chamber communicating with the receptacles.

2. The component of claim 1 wherein the first depth is measured from the first end face, and the open chamber defines a second depth measured from the first end face, wherein the second depth is greater than the first depth.

3. The component of claim 1 wherein the receptacle is defined by a pair of spaced-apart walls interconnected by an end wall, the end wall defining a rib flanked by the open chamber which is an extended recess.

4. The component of claim 1 wherein the receptacle is defined by a pair of spaced-apart walls, at least one of the walls having a tab extending therefrom.

5. The component of claim 1 wherein:
   the open chamber extends beyond the perimeter of the opening in at least one direction measured parallel to the plane of the first end face.

6. A sealing apparatus for a turbine engine, comprising:
   a component having a body bounded by a first end face;
   a spline seal having a body and one or more standoffs extending outwardly from the body;
   a seal slot having an opening communicating with the first end face, the seal slot including a receptacle defining a boundary configured to receive and position the spline seal therein, wherein the receptacle is defined by a pair of spaced-apart walls interconnected by an end wall, the end wall defining a rib flanked by an extended recess; and
   wherein the spline seal is received in the seal slot, and wherein the seal slot and the spline seal are configured such that an open space is defined between the seal slot and the spline seal.

7. The apparatus of claim 6 wherein the boundary of the receptacle defines a first depth measured from the first end face, and the body includes an open chamber defining a second depth measured from the first end face, wherein the second depth is greater than the first depth.

8. The apparatus of claim 6 wherein at least one of the walls of the pair of spaced-apart walls has a tab extending therefrom.

9. The apparatus of claim 6 wherein:
   the body is bounded by the first end face and a second end face spaced from the first end face;
   the second end face including a second seal slot, the second seal slot having an opening communicating with the second end face, and including a receptacle defining a boundary configured to receive and position a spline seal, wherein the first and second seal slots are interconnected by the extended recess which is an open chamber communicating with the receptacles.

10. The apparatus of claim 6 wherein:
the opening defines a closed perimeter on the first end face; and
an open chamber extends beyond the perimeter of the opening in at least one direction measured parallel to the plane of the first end face.

11. A turbine engine component, comprising:
a body bounded by an end face; and
first and second seal slots each having an opening communicating with the end face, the first and second seal slots intersecting each other;
wherein each opening includes at least two spaced-apart walls defining a perimeter on the end face; and
wherein at least one of the walls includes an expanded area extending beyond the perimeter, the expanded area being a curved fillet formed at an inside corner of the intersecting first and second seal slots.

12. The component of claim 11 wherein each of the first and second seal slots includes a receptacle defining a boundary configured to receive and position a spline seal, and an open chamber communicating with the seal slot and extending beyond the boundary.

13. The component of claim 12 wherein the boundary of the receptacle defines a first depth measured from the end face, and the open chamber defines a second depth measured from the end face, wherein the second depth is greater than the first depth.

14. The component of claim 11 wherein a receptacle is defined by a pair of spaced-apart inboard and outboard walls interconnected by an end wall, the end wall defining a rib flanked by an extended recess.

15. The component of claim 11 wherein:
the opening defines a closed perimeter on the end face; and
the open chamber extends beyond the perimeter of the opening in at least one direction measured parallel to the plane of the end face.

* * * * *